June 13, 1961　　　C. J. McHUGH, JR　　　2,988,195
ACCUMULATOR FOR CONVEYOR SYSTEMS
Filed Jan. 6, 1959　　　　　　　　　　　　　4 Sheets-Sheet 1

INVENTOR.
Charles J. McHugh, Jr.
BY
Wood, Herron & Evans
ATTORNEYS.

June 13, 1961  C. J. McHUGH, JR  2,988,195
ACCUMULATOR FOR CONVEYOR SYSTEMS
Filed Jan. 6, 1959  4 Sheets-Sheet 2
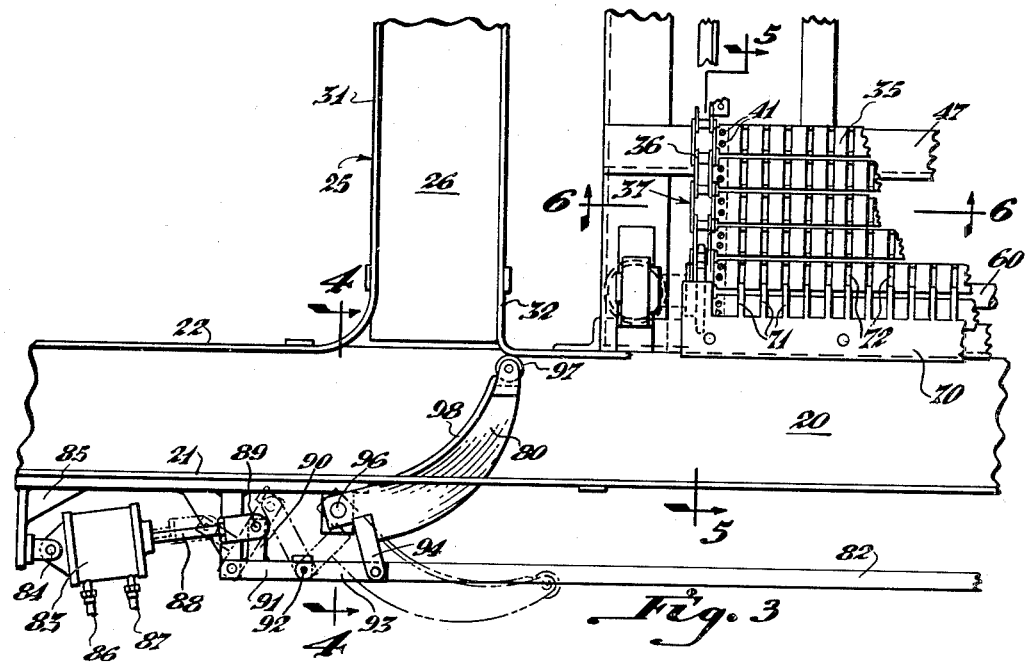
Fig. 3
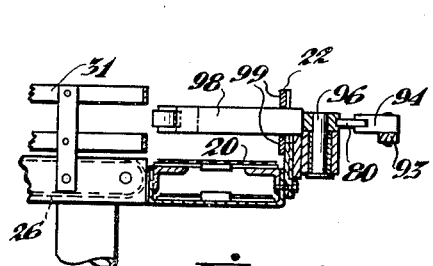
Fig. 4
Fig. 5
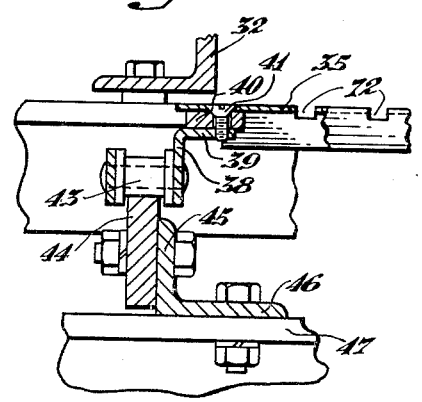
Fig. 6
INVENTOR.
Charles J. McHugh, Jr.
BY
Wood, Herron & Evans.
ATTORNEYS.

June 13, 1961 C. J. McHUGH, JR 2,988,195
ACCUMULATOR FOR CONVEYOR SYSTEMS
Filed Jan. 6, 1959 4 Sheets-Sheet 3
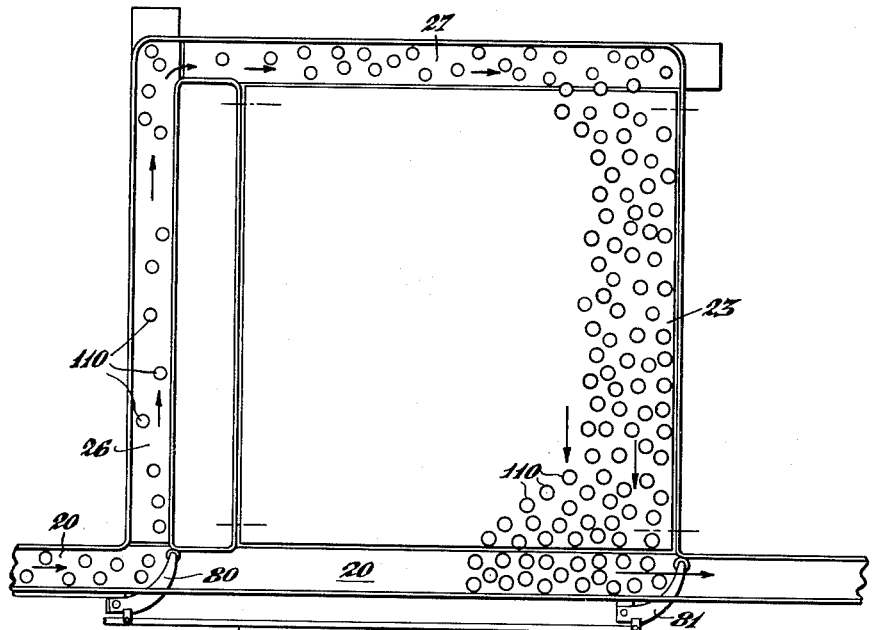
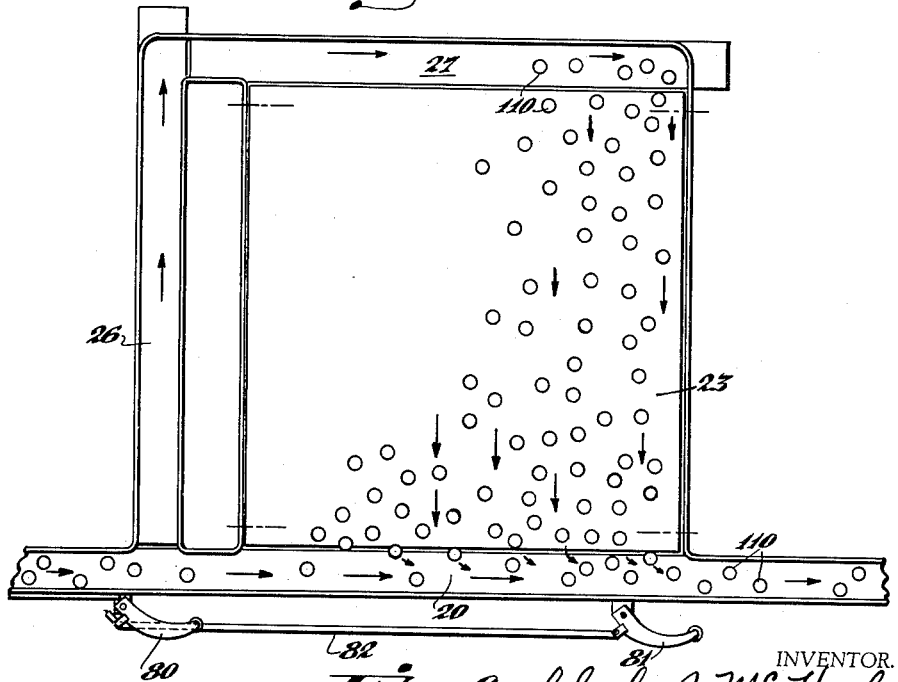
INVENTOR.
Charles J. McHugh, Jr.
BY
Wood, Herron & Evans
ATTORNEYS.

United States Patent Office 2,988,195
Patented June 13, 1961

2,988,195
ACCUMULATOR FOR CONVEYOR SYSTEMS
Charles J. McHugh, Jr., Cincinnati, Ohio, assignor to The Lodge & Shipley Company, Cincinnati, Ohio, a corporation of Ohio
Filed Jan. 6, 1959, Ser. No. 785,182
10 Claims. (Cl. 198—19)

This invention relates to conveyor systems which are employed to move containers such as bottles, cans and jars from machine to machine in a mechanized food or beverage processing plant.

In an operation of this sort, one machine may be employed to wash and sterilize the containers, another to fill them, another to place labels upon them, another to pack them into cartons etc. Ideally the machines should be timed and the conveyor systems should be arranged so that a steady flow of containers from one end of the line of machine to the other is maintained. However, the ideal situation seldom obtains. One machine may operate faster or slower than another in the line. Breakdowns occur, and machine, particularly packing machines, jam from time to time so that surges occur in the line, with the result that some sections of the line have more containers in them than other sections. These surges become critical, not only because of overcrowding in certain sections, but because of the scarcity or even lack of containers in other sections. A bottle filling machine, for example, cannot operate efficiently unless there is a bottle at each one of the multiple stations of the machine.

This invention concerns the problems created by such surges, and it is specifically directed to an accumulator in the nature of a table which is adapted to be placed along side of a conveyor, with means being provided to shunt containers from the conveyor onto the accumulator when surges occur, and then to automatically feed these containers back onto the conveyor after the surge condition has passed to thereby maintain an even flow of containers on the line.

In a food processing plant, for example, the accumulator of this invention may be placed along side of the conveyor which joins a washing and sterilizing machine with a filling machine. A supply of containers may be retained on the accumulator. Now if the washing and sterilizing machine, which is upstream of the accumulator, should break down or jam so that containers do not move from it, the accumulator can be employed to supply the line to the filling machine which is downstream of the accumulator. On the other hand, if a jam or breakdown occurs in the filling machine, the containers being discharged from the washing and sterilizing machine can be diverted to the accumulator which stores them. If the failure of the filling machine can be corrected without a long delay, the washing and sterilizing machine can be kept in operation. Then, as soon as the filling machine can be placed back in operation, the containers can be moved onto the line from the accumulator table and the operation of the line may continue without interruption.

The invention also concerns another problem which may be best exemplified by reference to a brewery operation. The problem is not unique with a brewery, but also exists in operations in food processing plants and in other beverage processing plants. In a brewery, filled and sealed bottles or cans of beer are conveyed through a continuously operating pasteurizing machine in which the containers of beer are heated progressively through several stages up to a pasteurizing temperature. Beer can be held at the pasteurizing temperature for only a short period of time, and this period of time is extremely critical, because if held at this temperature too long the beer becomes "scorched" and its flavor is ruined. In a typical brewery installation the cans or bottles of beer are held at the pasteurizing temperature while moving through a particular zone of the pasteurizing machine, the time in the zone being a function of the length of the zone and the rate at which the containers move. After passing this zone, the containers of beer are cooled and then moved to a labeling machine, if bottles, or to a packing machine, if cans. In either event, if there is a breakdown in the machine which is in the line immediately following the pasteurizer, and the pasteurizer has to be stopped, all of the bottles or cans held too long in the pasteurizing zone are ruined, and have to be taken from the line.

The accumulator of this invention may be placed adjacent to the conveyor at the discharge end of the pasteurizer so that the pasteurizer can continue its operation until the next machine in the line has been repaired. If it is apparent that the repair is going to take a long time, the pasteurizer can be continued in operation while the rest of the line is shut down so as to empty it of its contents and thereby avoid the scorching of all of the containers in the pasteurizing zone.

Thus the accumulator of this invention not only serves as a means to store an over supply of containers which might swamp a machine located downstream from it, but it also serves as a means to supply containers to that machine in the event there is a failure in the supply moving to it.

In the preferred embodiment of the invention the accumulator is in the form of a large rectangular table which is placed with one of the sides thereof parallel to and adjacent to the conveyor line. The surface of this table preferably is formed by the upper run of an endless metal link belt. This belt may be driven continuously at a slow rate of speed, but always in one direction, which is the direction toward the conveyor line which the accumulator is to serve. The table also includes an L-shaped conveyor, which preferably is of metal link construction. One leg of this L-shaped conveyor extends from the main conveyor line along side of the upstream end of the accumulator table, whereas the other leg of the L-shaped conveyor parallels the rear edge of the accumulator table. In the event of a surge, containers are diverted from the conveyor line to the rear edge of the accumulator table. From here they are moved forward slowly on top of the table and back to the main conveyor. Gates which may be operated from remote points control the flow of containers to and from the accumulator.

Attention is now directed to the following detailed description of the drawings in which:

FIG. 3 is a fragmentary top plan view thereof;

FIG. 4 is a cross sectional view taken along lines 4—4 of FIG. 3;

FIG. 5 is a cross sectional view taken along lines 5—5 of FIG. 3;

FIG. 6 is a cross sectional view taken along lines 6—6 of FIG. 3;

FIGS. 7 and 8 are diagrammatic views in plan showing the operation of the invention.

Figures 1, 2:
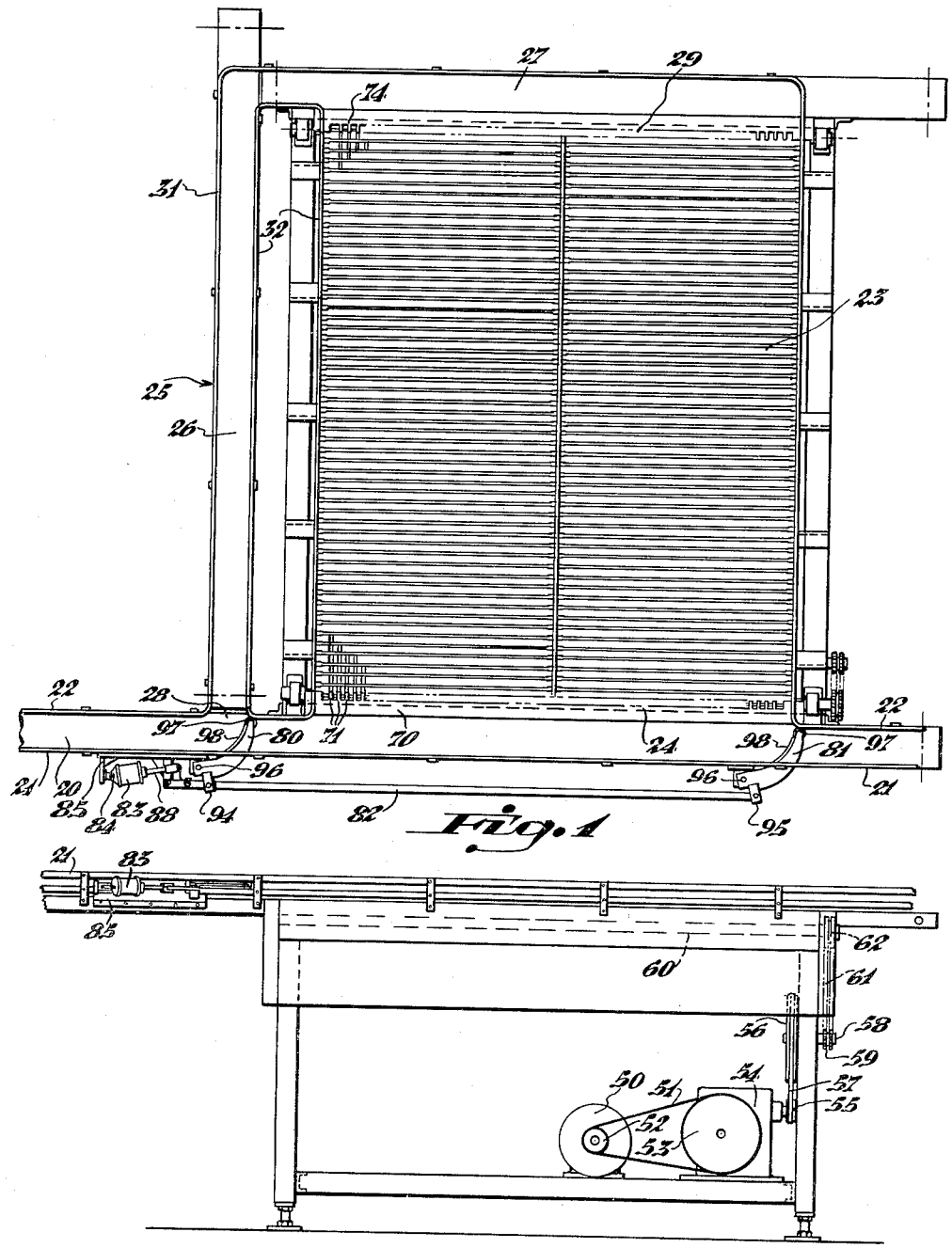
FIG. 1 is a top plan view of a portion of a conveyor system embodying the invention.
FIG 2 is an end elevational view thereof.

In the illustrated form of the invention the main conveyor system has as its principal conveying apparatus an endless belt conveyor 20 longitudinally bound by guide rails 21 and 22. Such conveyors are well known in the art and as such form no part of the invention.

The principal accumulating mechanism is a wide endless chain forming a surge accumulating table 23 having a discharge end 24 paralleling the main conveyor belt 20. The guide rail 22 is interrupted at the discharge end 24 of the accumulator table 23 to permit movement of articles from the accumulator table onto the main conveyor belt 20. Articles are diverted onto the surge table 23 by the L-shaped conveyor system, indicated generally at 25 which includes an endless belt conveyor 26 and an endless belt conveyor 27. These conveyor belts transfer articles from the location designated at 28 to the receiving end of the accumulator table indicated at 29. A generally U-shaped guide rail 31 cooperating with an O-shaped guide rail 32 (in plan view), channels the articles from the location 28 along belts 26 and 27, along accumulator table 23 and back onto the main conveyor belt 20. Thus a shunt path formed by the conveyor belts, accumulator table and guide rails is located across the main conveyor system between two stations to receive and accumulate articles until they may be passed along to the downstream station.

Accumulator table and drive mechanism

The accumulator table is formed as an endless chain which may be constructed generally as illustrated in Patent No. 2,147,055. As shown in FIGS. 3, 5 and 6, the upper surface of the table is formed by elongated channel members 35 which extend generally perpendicularly to the path of movement of the table. The channel members are carried by the links 36 of the endless chain 37. As best illustrated in FIG. 6, each link carries an L-shaped support 38. The horizontal leg 39 of the L-shaped support carries a spacer block 40 about which the end of the channel member 35 is disposed. A pair of screws 41 fasten each end of each channel member to the L-shaped support 38.

Each link has a roller 43 which rolls along a rail 44 bolted to an angle member 45. The angle member has a horizontal leg 46 bolted to the frame indicated at 47. The extremities of the channel members 35 extend under the guide rail 32 as best illustrated in FIG. 6 so that the guide rail 32 can maintain the articles moving along the accumulator table confined completely on the table.

The table is driven by an electric motor 50 (FIG. 2) which is connected by a belt 51 and pulleys 52 and 53 to a reduction gear box 54. The output end of the gear box has a pulley 55 which drives pulley 56 by means of a belt 57. The idler pulley 56 is mounted on a shaft 58 to which is fixed a pulley 59 driving a transverse shaft 60 by means of a belt 61 and pulley 62. A sprocket 63 is keyed as at 64 to the shaft 60 and engages the chain 37 to drive the accumulator table. An idler wheel 65 mounted on an arm 66 engages the belt 61 to maintain it tight on its pulleys 59 and 62.

The discharge of articles from the accumulator table to the main conveyor belt 20 as the accumulator table moves toward the belt 20 is facilitated by a comb-like bridge 70 having a plurality of teeth 71 which project into transverse slots 72 formed in the channel members 35. A similar comb-like bridge 74 facilitates movement of the articles from belt 27 onto the table 23.

Article diverting gates

At the upstream end and at the downstream end of the surge accumulating shunt path are gates 80 and 81 respectively. The gates when moved into the operative position shown in FIG. 1, block moving articles along the main conveyor belt 20. The gates are interconnected for unitary operation by a link 82.

The gates are operated by a piston and cylinder 83 pivoted at 84 to the conveyor frame 85 and supplied with fluid pressure through connections 86 and 87. A rod 88 connected to the piston which is movable within the cylinder is pivotally connected at 89 to an arm 90 which is fixed to a link 91. The arm 90 and link 91 form a bell crank lever which is pivotally connected at 92 to a link 93. The link 93 is pivoted to an arm 94 fixed to the gate 80. A corresponding arm 95 is fixed to gate 81 and is pivotally connected at its end to link 82. The gates 80 and 81 are pivoted to the conveyor frame 85 at respective pivot points 96.

A roller 97 is rotatably mounted at the end of the gates 80 and 81 to facilitate movement of the end of the gates through a packed line of bottles, cans or the like. Each of the gates has a curved vertical flange 98. The flange on gate 80 forms a substantially smooth continuation of the main conveyor rail 22 and the O-shaped guide rails 32 so that articles may pass smoothly around the corner formed by the intersection of the shunt conveyor with the main conveyor. As illustrated in FIG. 4 the rail 22 is formed of two members 99 which are spaced apart a distance such to permit the flange 98 to pass therebetween.

Gate operating system

Figure 9:
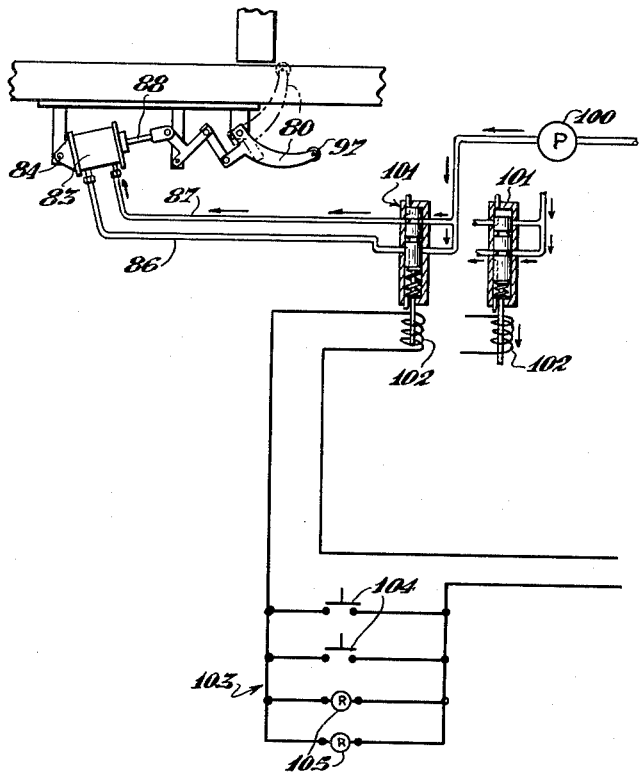
FIG. 9 is a diagrammatic view of the controller system for the invention.

As indicated above the piston and cylinder which operates the gate is supplied with fluid pressure through lines 86 and 87. The fluid pressure (preferably air pressure normally available at the conveyor installation) is supplied by a pump 100 (FIG. 9) and is connected through the lines 86 and 87 through a valve 101 operated by a solenoid 102. The solenoid 102 is operated by the system 103. Push buttons 104 may be disposed at various locations in the plant for a manual initiation of the operation of the system. Alternatively the operation of the system may be initiated by relays 105 which are associated with devices (not shown) which detect fault at appropriate stations in the system. When no difficulty exists at the downstream station, pressure is supplied through line 87 driving the piston and rod 88 toward the left as viewed in FIG. 9 to bring the gate to the inoperative position shown in full lines. When condition of fault at the downstream station is detected by the circuit illustrated at 103, pressure is supplied to a line 86 which extends the piston and rod 88 toward the right to swing the gate into operative or broken line position.

Operation

The operation of the invention can best be understood by referring to FIGS. 7 and 8. FIG. 7 illustrates the condition of the system when the downstream station is inoperative. The condition having been detected to cause the gate 80 to swing to operative position, articles 110 being processed are diverted along the surge shunt path which passes from the main conveyor belt 20 to conveyor belt 26; from conveyor belt 26 to conveyor belt 27; and thereafter drift from the conveyor belt 27 to the slow moving accumulator table 23. The accumulator table 23 will receive all of the articles diverted from the main conveyor system and will withhold them from returning to the main conveyor system for a period of time sufficient to permit fault at the downstream station to be cleared. In one installation a surge accumulator designed to receive approximately 600 containers per minute for a period of about seven minutes has been satisfactory.

FIG. 8 illustrates the condition of the apparatus when fault at the downstream station has been cleared. The detection of the operative condition of the downstream station effects the swinging of gate 80 to the inoperative position illustrated. Thereafter the articles begin to pass freely along the belt 20 to the downstream station. As soon as the articles on the shunt path reach the belt 20, they pass over the bridge 70 onto the belt 20 and move toward the downstream station along with the newly arriving articles from the upstream station.

If the surge accumulator is to be used to supply articles for processing in the event of a fault at an upstream station it will be necessary only to divert a charge of articles onto the chain table 23, and maintain them on the table until they are required to move into the system because of upstream fault. When such fault occurs, the table is driven toward the main conveyor 20 so that a supply of articles is continuously furnished to the downstream stations.

While there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

Having described my invention, I claim:

1. A conveyor system comprising first and second processing stations, means for transporting articles along a first path from said first station to a second station, surge means forming a second path from said first station to said second station shunting at least a portion of said first path, at least a portion of said surge means including a wide endless chain forming a table having a discharge end abutting and substantially normal to said first path, means for moving said endless chain table, and means for diverting articles onto said second path when said second station cannot accommodate additional articles.

2. A conveyor system comprising first and second processing stations, means for transporting articles along a first path from said first station to a second station, surge means forming a second path from said first station to said second station shunting at least a portion of said first path, at least a portion of said surge means including a wide endless chain forming a table having a discharge end abutting and substantially normal to said first path, means for moving said endless chain, gates pivotally mounted at the leading and trailing ends of said surge means, means for swinging said gates to a first position in which articles move directly along said first path and to a second position in which said first path is blocked and articles are diverted onto said second path and prevented from reaching said second station.

3. A conveyor system comprising first and second processing stations, means for transporting articles along a first path from said first station to a second station, surge means forming a second path from said first station to said second station shunting at least a portion of said first path, at least a portion of said surge means including a wide endless chain forming a table having a discharge end abutting and substantially normal to said first path, means for moving said endless chain, a gate pivotally mounted at the leading intersection of said first and second paths, and means for swinging said gate across said first path to divert articles from said first path onto said second path.

4. A conveyor system comprising first and second processing stations, conveyor means for transporting articles along a first path from said first station to a second station, surge means forming a second path from said first station to said second station shunting said first path, at least a portion of said surge means including a wide endless chain forming a table having a discharge end abutting and substantially normal to said first path, means for moving said endless table at a speed approximately equal to the speed of the conveyor means along said first path times the ratio of the width of said conveyor means to the width of said chain, and means for diverting articles onto said second path when said second station cannot accommodate additional articles.

5. A conveyor system comprising first and second processing stations, means for conveying articles along a first path from said first station to a second station, surge accumulating conveyor forming a second path from said first station to said second station shunting at least a portion of said first path, means for moving said second conveyor at a slow rate to cause articles moving between the point of intersection of said paths to require a substantially greater time when passing along said second path than when passing along the shunted portion of said first path, and means for diverting articles onto said second path when said second station cannot accommodate additional articles.

6. A conveyor system comprising first and second processing stations, means for transporting articles along a first path from said first station to a second station, surge accumulating means forming a second path from said first station to said second station shunting at least a portion of said first path, at least a portion of said surge accumulating means including a wide table, means for moving articles along said endless table, and means for diverting articles onto said second path when said second station cannot accommodate additional articles.

7. A conveyor system comprising first and second processing stations, a first conveyor for transporting articles from said first station to said second station, a second conveyor intersecting said first conveyor, means for selectively diverting articles from first conveyor to said second conveyor, a wide endless chain forming a moving conveyor table having a discharge end intersecting said first conveyor downstream of said intersection of said first and second conveyors, said second conveyor including a belt extending along the upstream end of said endless chain for conveying articles from said second conveyor to said chain.

8. An accumulator for use in conjunction with a main conveyor for containers, said accumulator comprising a wide, endless chain link belt having a flat upper run which is disposed with one end thereof adjacent to said main conveyor, an L-shaped shunt conveyor which is disposed with one leg thereof adjacent to the side of the accumulator which is toward oncoming containers on the main conveyor and the second leg of which is adjacent to the end of the accumulator opposite the main conveyor, and means to drive the endless belt of the accumulator continuously and in the direction toward the main conveyor.

9. An accumulator for use in conjunction with a conveyor system for containers, said accumulator adapted to be disposed with one end thereof immediately adjacent to said conveyor, a wide, endless chain link belt having a flat upper run which forms the upper surface of said accumulator, an L-shaped second conveyor disposed with one leg thereof at the side of said accumulator toward which containers move along the conveyor system and the other leg thereof at the end of the accumulator opposite the conveyor, and means to direct containers moving along the conveyor onto the L-shaped conveyor for delivery to the end of the accumulator opposite the conveyor.

10. An accumulator for use in conjunction with a conveyor system for containers, said accumulator comprising a wide, endless chain link belt having a flat upper run which forms the upper surface of the accumulator, an L-shaped conveyor disposed with one leg thereof at a side of said accumulator and the other leg at an end of the accumulator, means to direct containers moving along the conveyor onto the L-shaped conveyor for delivery to said end of the accumulator, and means to drive said belt such that the upper surface of the accumulator moves continuously away from said end.

References Cited in the file of this patent

UNITED STATES PATENTS

| | | |
|---|---|---|
| 756,551 | Abraham | Apr. 5, 1904 |
| 2,147,055 | Perkins | Feb. 14, 1939 |
| 2,804,961 | Carter | Sept. 3, 1957 |
| 2,833,393 | Kay | May 6, 1958 |